Patented Aug. 13, 1946

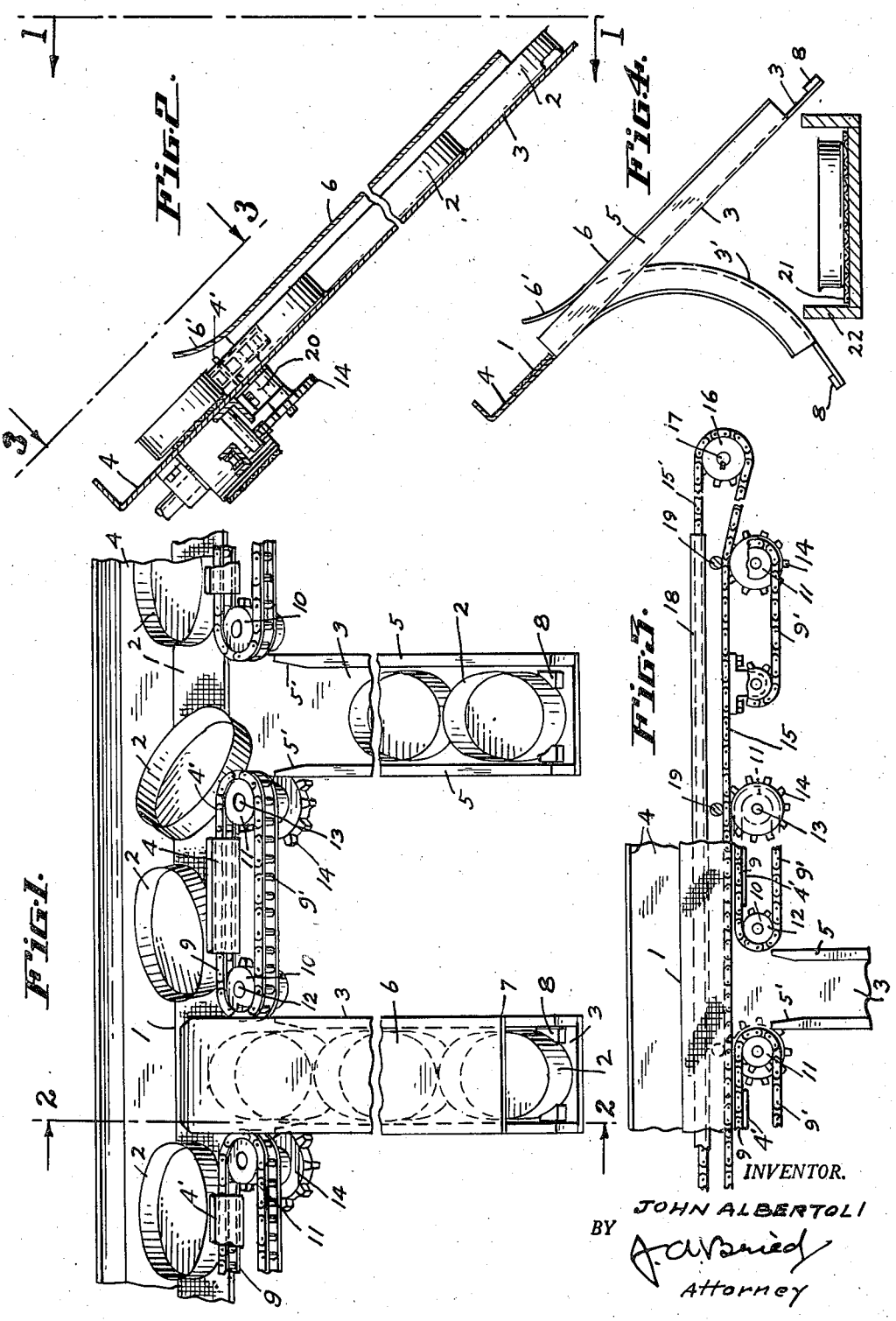

2,405,805

UNITED STATES PATENT OFFICE 2,405,805

OVAL CAN FEED

John Albertoli, San Francisco, Calif.

Application March 29, 1945, Serial No. 585,484

9 Claims. (Cl. 198—20)

This invention relates to the supplying of cans in canneries to a plurality of stations along a line where the cannery workers require the cans for packing the commodity.

The principal object of the invention is to provide improvements in such can feed lines which will handle oval cans, such as commonly used for packing fish. Also for oblong rectangular cans.

Special features and advantages of the invention will appear in the following description and accompanying drawings.

In the drawing

Fig. 1 is a side perspective view of a conveyor can feed as seen from the line 1—1 of Fig. 2.

Fig. 2 is a vertical cross section of Fig. 1 taken along the line 2—2 of Fig. 1.

Fig. 3 is a plan view of a portion of the feed conveyor as seen from the line 3—3 of Fig. 2 with portion of the of the conveyor belt and support broken away to reveal the sprocket and chain.

Fig. 4 is a reduced scale end view of the apparatus.

Briefly described the apparatus comprises a longitudinally extending belt or feed conveyor 1 carrying along a supply of empty oval cans 2 to supply various packing stations or tables not shown, and to each of which stations a take-off chute 3 extends from the conveyor and which chutes are always kept filled with cans so that the worker at each station can take off the lowermost can at intervals as required and the remaining cans will slide down the chute and another one from the feed conveyor will fall into the space created in the upper end of the take-off chute. The novel features have principally to do with means for turning the oval cans so that they will slide lengthwise down the take-off chutes and their upper ends will form a bridge for the oncoming cans in the feed conveyor.

In further detail, the conveyor belt 1 is supported at an angle of about 45° in a fixed wood or sheet metal trough 4 with the lower edge of the belt in contact with the lower edge 4' of the trough and which edge is cut away at a point where the station chutes 3 take off.

The can feed conveyor belt is endless and driven slowly by well known means not shown.

The descending station supply take-off chutes 3 are preferably substantially flush with the upper side of the trough 4 or upper side of the belt 1 and are of an internal width between marginal walls 5 to freely receive the narrow width of the oval cans 2, and widened out at their extreme upper ends as at 5' to facilitate sliding enry of the oval cans. However, as the oval cans 2 if not turned endwise with respect to the chutes 3 could not enter as they would be too long, I provide means adjacent each take-off chute for turning the cans about so that each can will soon be presented endwise to the take-off chute and will slide off of the conveyor into the chute unless the chute is already full—such as is the left chute 3 in Fig. 1—and in which case the cans on the conveyor will simply be carried along the conveyor to ride over the filled chutes until they come to one which has room in it to receive another one from the conveyor.

The chutes are preferably closed as by a cover plate 6 and left open from the point 7 downward and the lowermost can is stopped as by blocks 8 so that in order to take out a can the worker grasps the lower end wall of the lowermost can and lifts it over the stop blocks 8 and withdraws it from the chute.

In order to constantly turn the conveyed cans about adjacent each chute I provide a series of endless chains 9 with one strand running within the trough 1 and the other 9' without and passing over small sprockets 10, 11 mounted on axles 12, 13 suitably supported adjacent opposite sides of the take-off chutes. Axles 13 and/or 12 are extended and carry driving sprockets 14 secured thereto for driving sprockets 11 and chains 9, and sprockets 14 are in turn driven by one run 15 of a long endless chain which extends along the conveyor for a distance to include the desired number of take-off chutes. Chain 15 passes over sprockets at the ends of its loop as indicated at one end in Fig. 3 where it passes over sprocket 16 secured to a shaft 17 which may be driven from any suitable source of power. The upper run 15' of the chain is slidably supported in a fixed channel iron guide 18, and the lower run engages over each sprocket 14, preferably a suitable guard or roller 19 over the chain at each sprocket holding it in place. Axles 12 and 13 are suitably supported in bearings 20 best shown in Fig. 3.

With the above arrangement and the conveyor belt and chains 9 traveling in the same direction—to the left in Fig. 1—the oval cans 2 will be carried along to the left and also turned about as they ride over the space over each take-off chute and where the ends of adjacent chain loops passing over sprockets 10 and 11 operate in opposite directions against each can as it straddles the chute space and thereby revolves the can until it is turned with one end downward to slide down the chute.

It will be noted that even without the aid of the chains 9 the revolving sprocket wheels 10 and 11 would themselves tend to revolve the cans contacting them, and this is so even if the wheels had no teeth, especially if made of a material such as rubber setting up friction between the cans and the wheels, tho I prefer the added effect of the chains as it helps convey the cans. Also, it is evident that in place of the chains 9 belts may be used running over grooved pulleys, and accordingly any such equivalents are intended to be included in my use of the word chains. Also to be noted is that even without the belt 1 the cans would still be conveyed along the trough if chains 9 were used.

As previously mentioned, when a chute is full of cans as with the left chute of Fig. 1 the cans in the feed conveyor will pass right along over the top of the uppermost can in the chute as its upper end is then substantially on a line with the lower edge 4' of the conveyor trough.

In Figs. 2 and 4 the cover plate 6 of the chute 3 is shown curved outward at 6' at its upper end to facilitate entry of the cans from the feed conveyor. In Fig. 4 a lower or service conveyor is indicated at 21 running in a trough 22 past any number of packing stations to carry a supply of the commodity to the packers or filled cans away as may be desired, and in which view one of the take-off chutes 3 is shown extending angularly down and across the conveyor 21, while another take-off chute 3' is shown curved rearwardly to deliver its can at the opposite side of conveyor 21, as usually there are packing stations or tables spaced along both sides of such a conveyor.

Having thus described my novel can feed apparatus, what I claim is:

1. In a can feeding apparatus, a traveling conveyor arranged to support oval cans at an incline toward one edge of the conveyor, take-off chutes spaced along the conveyor open at their upper ends to receive cans sliding off of the conveyor, said chutes being of a width to receive the oval cans lengthwise of the oval only, and movable means other than the conveyor wall operating against the oval cans as they are conveyed along turning them about when at a take-off chute so as to slide off of the conveyor endwise into the chute.

2. In a structure as set out in claim 1, a second traveling conveyor adjacent the lower ends of said chutes, some of said take-off chutes passing slantingly downward delivering cans at one side of said second traveling conveyor, and others curving rearwardly to deliver the cans at the opposite side of said second traveling conveyor.

3. In a can feeding apparatus, a traveling conveyor arranged to support relatively shallow oval or oblong cans on edge for sliding from openings in the conveyor, take-off chutes spaced along the conveyor open at their upper ends to receive cans sliding off of the conveyor, said chutes being of a width to receive the narrow width of the cans only in single file, and movable means operating against the cans as they are conveyed along turning them about when at a take-off chute so as to direct them off of the conveyor endwise into the chute.

4. In a construction as set out in claim 3 the the means operating against the cans comprising wheels spaced at opposite corners of the upper open end of each chute and between which wheels the cans must pass to the chutes, and means revolving the wheels in direction to turn the cans about when in contact therewith.

5. In a construction as set out in claim 3 the means operating against the cans comprising sprocket wheels spaced at opposite corners of the upper open end of each chute and between which sprocket wheels the cans must pass to the chutes, and means revolving the wheels in direction to turn the cans about when in contact therewith.

6. In a can feeding apparatus a belt conveyor supported in a trough, said trough being tilted edgewise at an angle so that oval cans placed flat on the belt will slide down to the lower edge of the trough, a take-off chute extending downward from the lower edge of the trough and open at its upper end to receive cans sliding therefrom, endless chains positioned along the lower edge of the trough running over sprockets spaced at opposite sides of the upper end of the chute, means operating the conveyor belt and the chains in the same direction of travel whereby oval cans carried by the conveyor which are too long to pass into the chute when extending crosswise will be revolved upon reaching said sprockets until presented endwise to the chutes for sliding off of the inclined conveyor thereto.

7. In a structure as set out in claim 6 one sprocket of each endless loop of chain being secured to an axle carrying a driving sprocket, and a driving chain extending successively over one side of a plurality of such driving sprockets.

8. A can conveyor comprising a substantially flat bottomed trough having an edge wall and tilted transversely with said edge wall lowest to cause relatively shallow oval or oblong cans placed flatwise therein to slide down toward the lower edge of the trough, and conveyor chain means in the trough arranged to run against the inner side of said lower edge, a gravity chute opening through said lower edge of the trough to receive cans falling from the trough, and a gap in said conveyor chain means at said chute permitting the cans to fall down the chute.

9. In a structure as set out in claim 8, a conveyor belt in the trough against the bottom.

JOHN ALBERTOLI.